UNITED STATES PATENT OFFICE.

CAMILLE POULENC, OF PARIS, FRANCE.

PROCESS OF OBTAINING LITHIUM SALTS.

No. 836,781.   Specification of Letters Patent.   Patented Nov. 27, 1906.

Application filed May 15, 1906. Serial No. 317,026.

*To all whom it may concern:*

Be it known that I, CAMILLE POULENC, chemist, a citizen of the Republic of France, residing at Paris, in the Republic of France, have invented certain new and useful Improvements in the Process of Obtaining Lithium, (for which application has been made in France, May 27, 1905; in Great Britain, No. 9,971, April 28, 1906, and in Germany, April 30, 1906,) of which the following is a specification.

This invention relates to a practical and economical process for the extraction of lithium in the condition of carbonate of lithia from amblygonite and other lithium ores.

This process consists in treating amblygonite or other ore with the sulfuric acid contained in acid sodium sulfate. It is substantially characterized by the use of acid sodium sulfate reduced to the condition of fine powder, which is intimately mixed with the ore which has also been pulverized, this mixture being then heated and the temperature raised to red heat.

The use of sulfuric acid in the form combined with sodium sulfate offers considerable advantages. First of all, with this acid the reaction takes place at a temperature higher than boiling-point, and consequently under conditions which are very favorable for attacking the ore. Further, by reducing the acid sodium sulfate to a fine powder of a known percentage of free acid and also reducing the ore to powder, the composition of which may be determined, it is easy to exactly proportion the mixture of these bodies, and thus to avoid the use of a deleterious excess of acid in the course of the treatment. This treatment is carried out in suitable apparatus.

The following is a description of the process applicable to amblygonite. The acid sodium sulfate and the amblygonite, both finely pulverized, are mixed in exactly-calculated proportions, and they are progressively heated in a suitable apparatus—for instance, in cast-metal retorts for the first period and then in fire-clay retorts for the higher temperatures. During the operation, and more particularly during the first period, hydrofluoric acid mixed with fluorid of silicon is given off, which is collected and condensed. After the roasted mass has cooled it is subjected to lixiviation. The liquor obtained contains principally sodium sulfate and lithium sulfate. If the proportions of ore and acid sulfate contained in the mixture treated have been suitable, and they vary necessarily according to the analysis of the ore and of the bisulfate, the liquor should be neutral and only contain traces of alumina, lime, and iron. These impurities are then precipitated by the addition, while hot, of a small proportion of carbonate of soda. After filtration and concentration the liquors are treated with a hot concentrated solution of carbonate of soda in sufficient quantity to precipitate the lithia in the condition of carbonate.

The mother-liquor furnishes when cooled crystalline sodium sulfate. The insoluble residue which remains in the lixiviation-vat consists of phosphate of alumina containing about fifty per cent. phosphoric anhydrid.

The precision easily obtained in the mixture of ore and acid sulfate results in all the lithia being caused to pass into a condition of soluble sulfate, while the whole of the alumina remains insoluble in the residue from the lixiviation, while an excess of sulfuric acid would have involved the dissolving of a large proportion of alumina, the presence of which would be extremely deleterious to the process of treatment.

This very simple process allows of the economical extraction of the lithia in the form of carbonate and of a reconversion into the form of sodium sulfate of the acid sulfate employed. It also allows of the extraction of fluorin in the condition of hydrofluoric acid as well as of phosphoric acid in the form of phosphate of alumina suitable for use as manure or in any other form by a suitable treatment of this phosphate of alumina.

This process of treatment with acid sulfate of sodium may also be applied to reducing other lithium ores.

I declare that what I claim is—

The process of obtaining lithium carbonate from the ores of this substance, which consists in pulverizing acid sodium sulfate and the ore, and then mixing the said sulfate and the ore in exactly-predetermined proportions, progressively heating the mixture to red heat, lixiviating the roasted mass to obtain a solution of lithium sulfate, and after purification, precipitating the lithium as lithium carbonate substantially as described.

In witness whereof I have hereunto signed my name, this 2d day of May, 1906, in the presence of two subscribing witnesses.

CAMILLE POULENC.

Witnesses:
ANTONIN MONTEILHET,
HANSON C. COXE.